No. 704,643. Patented July 15, 1902.
G. E. HORR.
CATTLE STALL.
(Application filed Mar. 21, 1902.)
(No Model.)
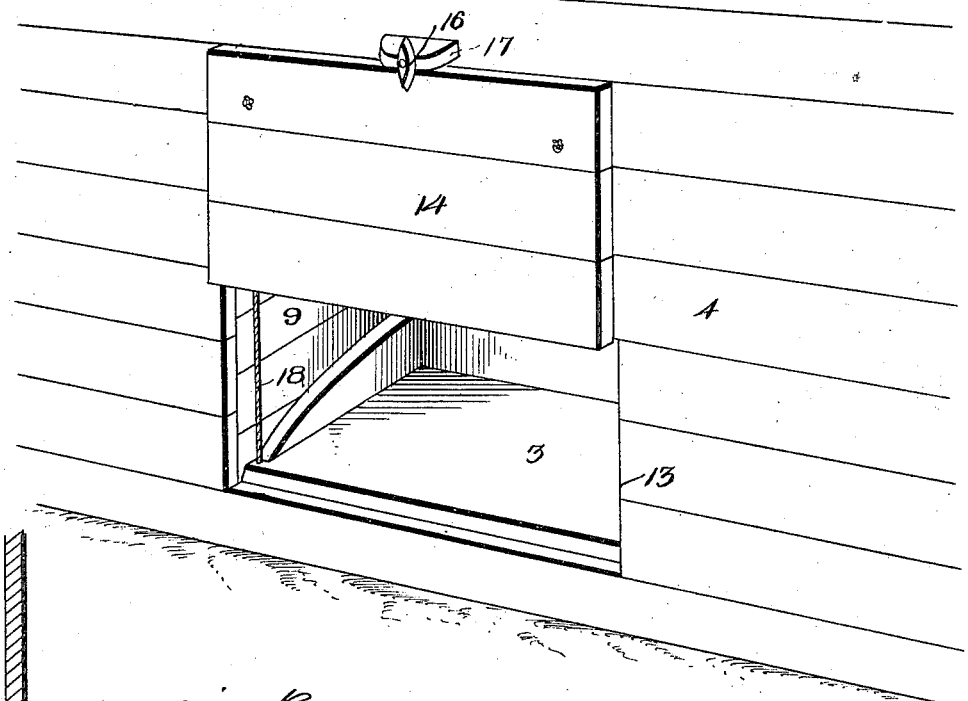
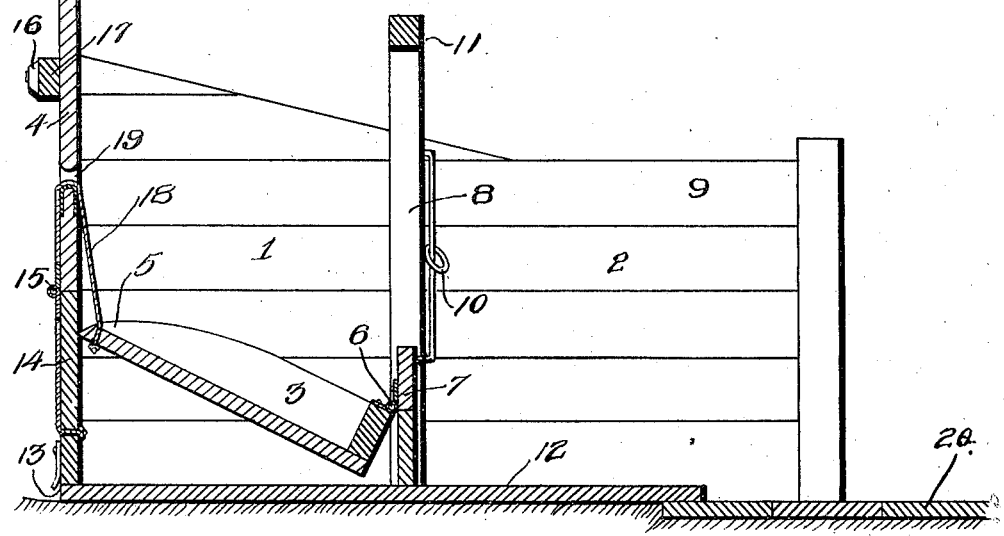
George E. Horr, Inventor.

UNITED STATES PATENT OFFICE.

GEORGE E. HORR, OF NORWAY LAKE, MAINE.

CATTLE-STALL.

SPECIFICATION forming part of Letters Patent No. 704,643, dated July 15, 1902.

Application filed March 21, 1902. Serial No. 99,383. (No model.)

*To all whom it may concern:*

Be it known that I, GEORGE E. HORR, a citizen of the United States, residing at Norway Lake, in the county of Oxford and State of Maine, have invented a new and useful Cattle-Stall, of which the following is a specification.

My invention is an improved cattle-stall; and it consists in the peculiar construction and combination of devices hereinafter fully set forth and claimed.

In the accompanying drawings, Figure 1 is an exterior perspective view showing the head or outer wall of the stall, the door through which feed is placed in the feed-trough, and showing the latter in a horizontal position. Fig. 2 is a vertical sectional view of the stall, showing the door closed and the feed-trough inclined laterally.

In the embodiment of my invention I provide the crib 1, which is at the head of the stall 2, with a feed-trough 3, which is located in the bottom of the crib and so supported that it may be inclined laterally, so that its inner side will be lowermost or lowered to a horizontal position. The outer side of the feed-trough where it approaches the wall 4, which forms the head of the stall, is open, as at 5. I here show the inner side of the feed-trough hinged, as at 6, to the low transverse wall 7, which divides the crib from that portion of the stall in which the animal stands. At one side of the stall is a stanchion-rod 8, which is vertical, or approximately so, and is here shown as connecting the wall 7 to one of the side walls 9 of the stall, and on the said stanchion-rod is a ring or link 10, to which the animal may be hitched and which ring or link is free to move up and down upon the stanchion-rod. A bar or plate 11 is preferably employed and disposed transversely above the wall 7 at a suitable height thereabove. The floor 12, which forms the bottom of the crib and the inner portion of the stall adjacent to the crib, is somewhat higher than the floor 20, which forms the rear portion of the stall and extends into the alley-way by which the animal enters the stall.

The wall 4, which forms the head of the stall, is provided with an opening 13, which communicates with the crib and through which feed may be placed in the feed-trough 3. I provide a door 14 to open and close the said opening, and the said door is here shown as hinged at its upper side, as at 15. I also show a turn-button 16, by means of which the door may be locked when in an open position, as shown in Fig. 1, the said turn-button being mounted on a block 17, which projects from the outer side of the wall or stall-head 4. The door 14 is connected to the free outer side of the feed-trough 3 by a flexible connection 18 or a plurality of such connections, one of which is here shown as a cord, and the same is shown as passing through a guide-opening 19 in the stall-head or wall 4 above the opening 13. It will be understood that a suitable direction sheave or pulley may be provided to reduce friction on the said cord or connection. The length of the latter is such that when the door is opened, as shown in Fig. 1, the feed-trough is lowered to a horizontal position, or approximately so, to enable the same to be readily supplied with feed through the opening 13 and the open side 5 of the feed-trough, and when the door is lowered to a closed position, as shown in Fig. 2, the feed-trough is raised by the connection 18 to an inclined position, so that the inner side of the feed-trough next the wall 7 is lowermost and the feed is caused by gravity to lie in the lower inner side of the feed-trough, where it can be readily reached by the animal, and the animal is thus prevented from reaching to the head of the stall and from standing in the head portion of the stall, and hence the accumulation of dirt in the head portion of the stall on the floor 12 is avoided. It is well known that the habit of cows is to lie when at rest close to the stanchion, and by thus preventing the animal from reaching to the head end of the stall and from standing therein the floor 12 is kept clean and the bedding and the animal are kept in the same condition.

Having thus described my invention, I claim—

1. A feed-trough mounted pivotally for movement from a horizontal to an inclined position, in combination with a door in a wall at the outer side of the trough and a connection between the door and trough, whereby the latter will be lowered when the door is opened and inclined when the door is closed, substantially as described.

2. A stall having a feed-trough in the head thereof mounted pivotally for movement from a horizontal to an inclined position, a door in the wall forming the head of the stall and a connection between the door and trough, whereby the latter will be lowered when the door is opened and inclined when the door is closed, substantially as described.

3. A stall having a cross-wall near its head whereby a crib is formed between said cross-wall and the head of the stall, the latter having an opening and a door to close the same, in combination with a feed-trough in said crib hinged to said cross-wall and a connection between the door and trough whereby the latter will be turned to an inclined position with its hinged, inner side lowermost when the door is closed, substantially as described.

In testimony that I claim the foregoing as my own I have hereto affixed my signature in the presence of two witnesses.

GEORGE E. HORR.

Witnesses:
HOWARD D. SMITH,
GEO. E. TUBBS.